United States Patent [19]

Goldman et al.

[11] Patent Number: 5,485,569
[45] Date of Patent: Jan. 16, 1996

[54] METHOD AND APPARATUS FOR MONITORING DISPLAY SCREEN EVENTS IN A SCREEN-ORIENTED SOFTWARE APPLICATION TOO

[75] Inventors: Jason Goldman; Byron T. Jenings, Jr., both of Ft. Collins, Colo.

[73] Assignee: Hewlett-Packard Company, Palo Alto, Calif.

[21] Appl. No.: 238,197

[22] Filed: May 4, 1994

Related U.S. Application Data

[63] Continuation of Ser. No. 963,786, Oct. 20, 1992, abandoned.

[51] Int. Cl.[6] .................................................. G06F 17/50
[52] U.S. Cl. ........................ 395/159; 395/149; 395/155
[58] Field of Search ................................ 395/149, 159, 395/100, 155

[56] References Cited

U.S. PATENT DOCUMENTS

| | | | |
|---|---|---|---|
| 4,646,250 | 2/1987 | Childress | 395/149 |
| 4,763,356 | 8/1988 | Day, Jr. et al. | 395/149 |
| 4,807,123 | 2/1989 | Komatsu et al. | 395/149 |
| 5,040,131 | 8/1991 | Torres | 395/159 |
| 5,047,960 | 9/1991 | Sloan | 395/149 |
| 5,075,847 | 12/1991 | Fromme | 395/700 |
| 5,214,756 | 5/1993 | Franklin et al. | 395/159 |
| 5,228,137 | 7/1993 | Kleinerman et al. | 395/500 |
| 5,349,675 | 9/1994 | Fitzgerald et al. | 395/800 |
| 5,367,628 | 11/1994 | Ote et al. | 395/162 |

OTHER PUBLICATIONS

"Microsoft Windows User's Guide for the Windows Graphical Enviornment Version 3.0", Microsoft Corporation (1990) pp. 17–82.

Evans et al., "An Integrated C Programming Enviornment", Thirty–Fifth IEEE Computer Society International Conference, Intellectual Leverage, Digest of Papers, IEEE Computer Society (1990) pp. 356–359.

Yang et al., "Integrating Computer–Aided Software Engineering and User Interface Management Systems", Vol. II of the Proceedings of the Twenty–Second Annual Hawaii International Conference on System Sciences, IEEE Computer Society Press (1989), pp. 850–859.

Erdogan et al., "Eden: An Integrated Computer–Aided Software Engineering Enviornment", 1989 Conference Proceedings of the Eight Annual Interantional Phoenix Conference on Computers and communications, IEEE Computer Society Press (1989), pp. 349–353.

Dettmer, "X Windows–The Great Integrator", IEE Review, vol. 36 No. 6 (Jun. 1990), pp. 219–222.

Watson, "Developing Software Using X Windows", IEE Colloquim on Software Tools for Windows–Based Application Development (Mar. 1990), pp. Sep. 1 to Sep. 3.

Zachman, "The Other Windows", PC Magazine, (Nov. 13, 1990), pp. 95–96.

Sorensen, "A Window View", Digital Review, vol. 7 No. 44 (Nov. 12, 1990), pp. 25–27.

Petzold, "PM Programs and Non–PM Programs", PC Magazine (May 16, 1989), pp. 297, 298, 300, 303, 305, and 306.

*Primary Examiner*—Heather R. Herndon
*Assistant Examiner*—Cliff Nguyen Vo

[57] ABSTRACT

A screen-oriented application tool is integrated into a computer-aided software development system including one or more software development tools for performing predefined software development tasks. An interface program controls communication between the software development system and a screen-oriented application tool that contains a representation of a display screen. The interface program monitors inputs and outputs of the application tool and generates a trigger when a predefined application tool event has occurred within a predefined region of the display screen. The event region of the display screen is defined by a start row, an end row, a start column and an end column. The application tool events include cursor events wherein the cursor enters or exits the predefined region, text events wherein the text within the predefined region is modified and expression events wherein the text within the predefined region is modified and the new text matches a desired pattern.

14 Claims, 11 Drawing Sheets

```
buffer ->" Test Edit Buffer

" This could be a vi edit session,
" in which case, the cursor entering
" the bottom line can indicate that
" the program has just entered command mode.
~
~
..

Old Cursor position:    X = 1   Y = 1
New Cursor position:    X = 2   Y = 9

Region:  start_row = 9, end_row = 9
         start_column = 1, end_column = 43
```

FIG 5 buffer ->"Test Edit Buffer

This could be a vi edit session,
in which case, the cursor exiting
the bottom line can indicate that
the program has just left command mode.
~
~
:

Old Cursor position:   X = 2   Y = 9
New Cursor position:   X = 1   Y = 1

Region:   start_row = 9, end_row = 9
          start_column = 1, end_column = 43

FIG 6

```
start_column
     ┬
     V
buffer ->'  · · · · · · ·   Personnel Record
                            Name:  _John_Smith_III_____
                            Address: _123_Elm_St_____
                                     _Anywhere_CO_89456_____
start_row ->'  <
end_row --|  [Added as new employee 12345]

Pattern = 'Added as new employee [0-9]*'

If the event waits for the cursor to leave the region,
it knows that the employee number (represented in the
pattern by a regular expression) is complete.
``` end_column
    ┬
    V
· · · · · · ·

FIG 7

OVERVIEW OF APPLICATION OUTPUT INTERPRETATION

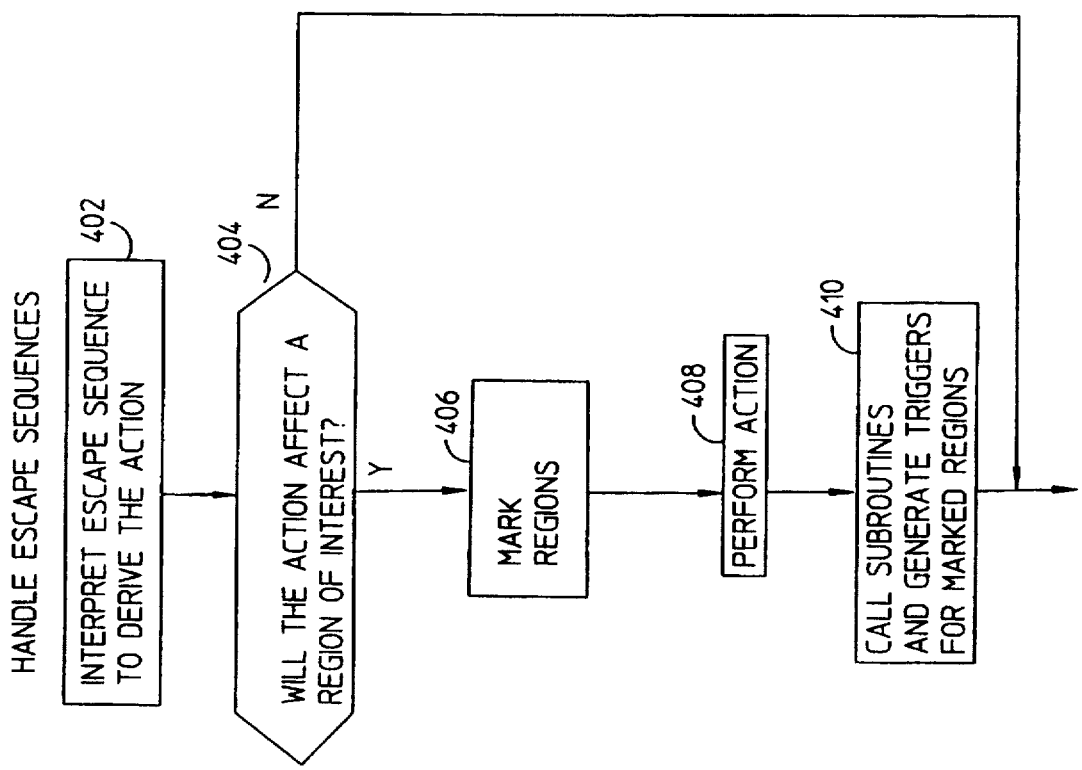

METHOD AND APPARATUS FOR MONITORING DISPLAY SCREEN EVENTS IN A SCREEN-ORIENTED SOFTWARE APPLICATION TOO

CROSS REFERENCE TO RELATED APPLICATION(S)

This is a continuation of application Ser. No. 07/963,786 filed on Oct. 20, 1992, now abandoned.

FIELD OF THE INVENTION

This invention relates to methods and apparatus for computer-aided software engineering and, more particularly, to methods and apparatus for efficiently monitoring display screen events when a screen-oriented software application tool is integrated into a computer-aided software engineering system.

BACKGROUND OF THE INVENTION

Computer-aided software engineering (CASE) systems have been developed to assist computer programmers in the construction, test and maintenance of complex computer software. Such systems assist the programmer in building or compiling the program and in analyzing the program, both statically and dynamically. Modern CASE systems are intended to operate in an environment where teams of programmers work on the development of a complex program. In many instances, CASE systems operate with a window-based user interface.

CASE systems typically involve a number of different software tools, or programs, designed to assist in program development. Such tools typically include a program edit tool, a build tool, a debug tool and a version management tool. The tools may be integrated to cooperate over a problem domain to further facilitate automation of software development tasks. CASE systems typically utilize the UNIX operating system or modifications of the UNIX operating system. (UNIX is a registered trademark of AT&T in the USA and other countries.) Software can be developed on CASE systems efficiently without requiring programmers to have a detailed knowledge of the development tools or the underlying operating system.

It is frequently desirable to customize CASE systems for particular applications. It is not uncommon for programmers in a particular industry or technical field to rely upon specialized programs, or development tools, because of the nature of the programs which they are developing. For example, programmers working with engineering design programs may rely on one or more specialized development tools, while programmers working with telecommunication programs may rely on an entirely different set of specialized development tools. Such tools may include, for example, UNIX system tools that are not frequently used or tools that are specially developed for a particular application.

A technique for integrating specialized development tools, also known as application tools, into a CASE system is disclosed in U.S. Pat. No. 5,075,847 issued Dec. 24, 1991 to Fromme, which is hereby incorporated by reference. The disclosed technique, commonly known as encapsulation, permits application tools to be integrated into a CASE system without reengineering the application tool and using only the binary code of the application tool. The application tool is integrated, or encapsulated, into the CASE system by providing an interface program which controls communication between the application tool and the remainder of the system. The interface program responds to predefined application tool events and to events in the remainder of the system that require communication with the application tool. Thus, all inputs and outputs of the application tool are controlled by the interface program.

It is frequently desirable to encapsulate a class of application tools known as full screen programs into a CASE system. A full screen application tool is one that places text in fixed locations on a display screen. A well-known example of a full screen application tool is a spreadsheet program. When a screen-oriented application tool is encapsulated into a CASE system, it is desirable to recognize specified output conditions of the application tool and to react to them. For example, it may be desirable to determine when the text in a predefined region of the screen changes or when the text matches a desired pattern. These conditions or events must be recognized without modification of the application tool code.

The most obvious way to recognize application tool events is to search through the buffer which represents the display screen for a text string pattern which matches a desired output condition. This approach has a basic weakness. Searching in bulk does not focus on the types of output conditions that normally occur with screen based programs such as "vi", "xdb" or "isql". Some of these programs have screen events of interest that are based solely upon cursor movement and position, not text in the buffer. Simply searching the screen buffer also does not permit recognition of events that are a hybrid of text events and cursor events. Another problem is that some text related events are not easily described by a pattern. For example, the program might output peoples' names, which do not match a specific pattern string. Also a pattern search of the screen buffer may result in several matches when only one is of interest. Finally, this technique has problems in controlling repeat matches. When a pattern matches, it will match repeatedly until the text changes. Avoiding this adds complexity to the event recognition mechanism.

SUMMARY OF THE INVENTION

According to the present invention, methods and apparatus are provided for operating a screen-oriented software application tool in a computer-aided software development system. The software development system includes an electronic digital computer and computer software for operating the computer. The computer software comprises a user interface, an operating system and one or more software development tools for performing predefined software development tasks. An interface program controls communication between the software development system and a screen-oriented application tool that contains a representation of a display screen having a cursor. The interface program monitors inputs and outputs of the application tool and generates a trigger when the step of monitoring inputs and outputs indicates that a predefined application tool event has occurred within a predefined region of the display screen. The trigger indicates the occurrence of the predefined application tool event within the predefined region. The predefined region is preferably defined by a start row, an end row, a start column and an end column.

In a first feature of the invention, the interface program generates a trigger when the cursor enters a predefined region. In a second feature of the invention, the interface program generates a trigger when the cursor exits a predefined region. In a third feature of the invention, the interface program generates a trigger when the text within a predefined region is modified. In a fourth feature of the invention, the interface program generates a trigger when the text within a predefined region is modified and the cursor has exited from the predefined region. In a fifth feature of the invention, the interface program generates a trigger when the text within a predefined region has changed and the new text matches a desired pattern. In a sixth feature of the invention, the interface program generates a trigger when the text within a predefined region has changed, the new text matches a desired pattern and the cursor exits from the predefined region.

Typically, a subroutine or a command is executed when the interface program generates a trigger. Execution of the subroutine may involve notifying the user that the predefined application tool event has occurred and/or may involve notifying one or more of the software development tools that the predefined application tool event has occurred. The software development tools can be notified of the predefined application tool event by sending a message to a broadcast message server for forwarding to one or more software development tools. Finally, execution of the subroutine may involve sending one or more commands to the application tool. The predefined application tool event can be mapped onto a region of a user display screen that is different from the predefined region associated with the application tool.

BRIEF DESCRIPTION OF THE DRAWINGS

For a better understanding of the present invention, reference is made to the accompanying drawings, which are incorporated herein by reference and in which:

FIGS. 4–7 are representations of display screens that illustrate detection of predefined application tool events within predefined regions of the display screen; FIGS. 9–11 are flow diagrams that illustrate the steps involved in processing application tool output and generating a trigger when a predefined application tool event has occurred within a predefined region of the display screen.

DETAILED DESCRIPTION OF THE INVENTION

The present invention relates to encapsulation, or integration, of screen-oriented application tools into a computer-aided software engineering system and to recognition of certain types of screen-oriented application tool events. The following is a brief description of a suitable CASE system.

Figure 1:
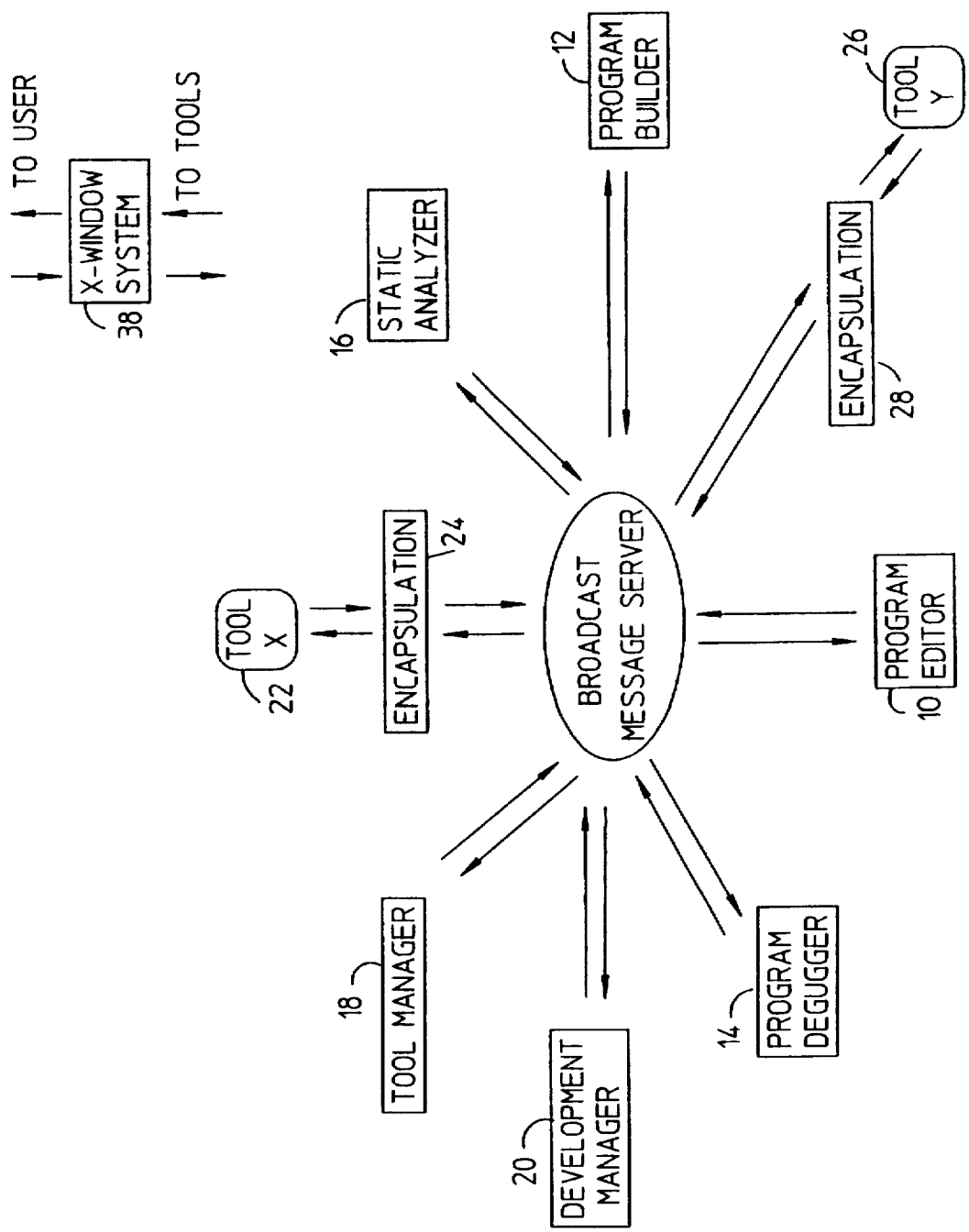
FIG. 1 is a simplified block diagram that illustrates the major software components of a computer-aided software engineering (CASE) system.

A block diagram of the major software components of a typical computer-aided software engineering system is shown in FIG. 1. The system includes a set of program development tools, including a program editor 10, a program builder 12, a program debugger 14, a static analyzer 16, tool manager 18 and a development manager 20. The system also includes an application tool 22 that is controlled by an encapsulation 24 and an application tool 26 that is controlled by an encapsulation 28. The encapsulations 24 and 28 are interface programs which control custom application tools as described below. The term "tool" is used herein to denote a software routine or program for performing a predefined function or set of functions. The tools are integrated to provide a complete CASE system. The program editor 10 and the program builder 12 are associated with program construction, while the program debugger 14 and the static analyzer 16 are associated with program analysis and testing. It will be understood that different software development tools can be substituted into or added to the CASE system shown in FIG. 1. The tools 10, 12, 14, 16, 18, 20, 22 and 26 are controlled and integrated by an operating system known as a tool integration platform. The tool integration platform performs the functions of communication between tools, work area management, distributed tool execution, user interface management and encapsulation of custom application tools. The tool integration platform includes a broadcast message server 36 which provides an effective means for communication between tools. An X-Window System 38 provides a user interface between each of the tools in the system and a user. Encapsulations 24 and 28 are also part of the tool integration platform. An example of a CASE system is SoftBench, available from Hewlett-Packard Company.

Figure 2:
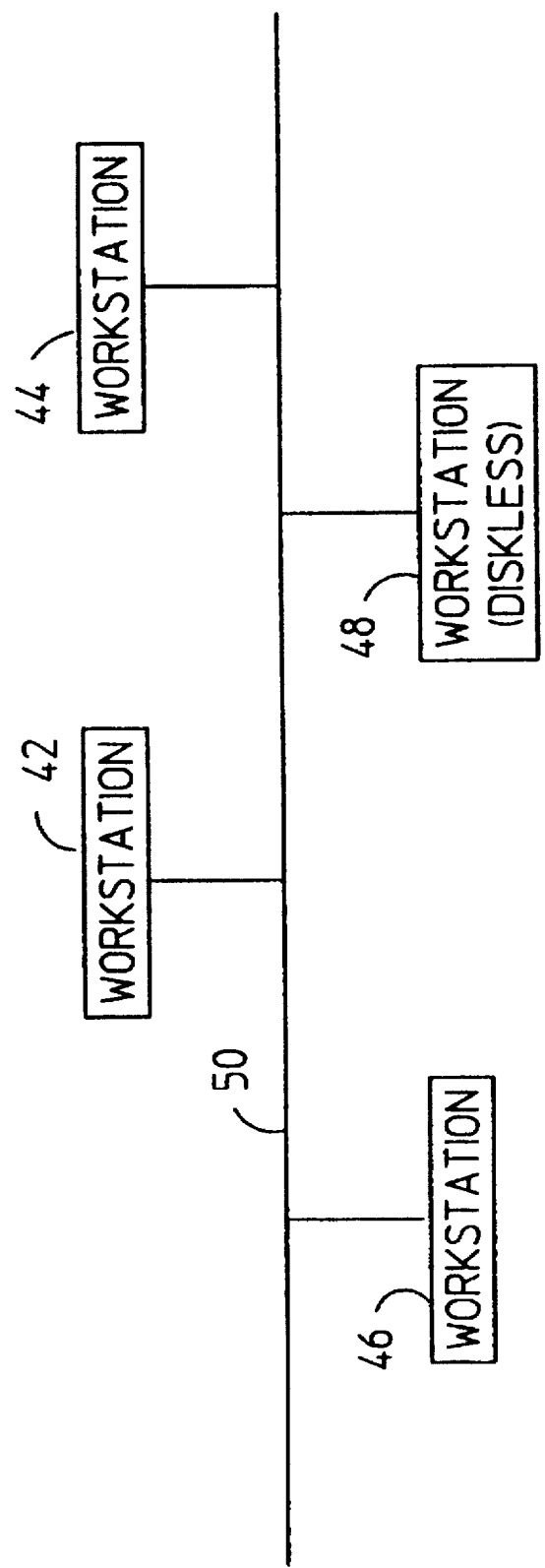
FIG. 2 is a block diagram of a distributed computing system on which the CASE system can be run.

The CASE system supports a multi-workstation, distributed computing environment. A typical system configuration is shown in FIG. 2. Workstations 42, 44, 46 and 48 are interconnected on a network 50. The workstations 42, 44 and 46 are configured with disk storage units, while workstation 48 does not include a disk storage unit. The workstations can each access resources in other workstations. The workstation 48 utilizes the disk in one of the other workstations. Any number of workstations can be utilized in a distributed system of the type shown in FIG. 2.

The CASE system described herein can be run on a Series 300 or Series 800 workstation, manufactured by Hewlett-Packard Company. Typical hardware requirements on either workstation include 8 or 16 megabytes RAM, a high resolution display, keyboard and mouse and a 150 or 300 megabyte disk. The CASE system is run with the HP-UX Operating System, a UNIX based operating system and X11 Windows, a system for support of window-based operation. However, the present invention is not limited to use with the above hardware and software and can be utilized with any suitable general purpose computer.

Communication with other tools in the CASE system takes place through the message server 36. A tool requests action by one or more other tools by sending a request to the message server. The message server 36 then forwards the request to the appropriate tool or tools. The tool that executes the request is known as a server. After completion of the requested action, a success or failure notification is sent by the server to the message server 36. The notification is forwarded by the message server 36 to the requesting tool and to any other tools that wish to receive it. The message server 36 determines, in accordance with predefined patterns registered by each tool, the tools to which each message is forwarded. Frequently a request or a notification is forwarded to several tools. Communication between tools through the message server is driven by events occurring in each of the tools. Communication between the user and the tools in the CASE system is through a separate user interface. In the window-based CASE system, the user communicates through an X-Window System. (The X-Window System is a trademark of MIT.)

A feature of the CASE system that is important to the present invention is the use of triggers. Triggers are cause/ effect relationships which can link arbitrary combinations of tools in the CASE system. Triggers activate on system or user events and can cause system or user-defined actions to occur. The actions may include sending messages to other tools or running predefined commands or routines. Triggers are particularly useful in connection with encapsulated application tools. Examples of triggers are given in the aforementioned U.S. Pat. No. 5,075,847, which is hereby incorporated by reference.

Figure 3:
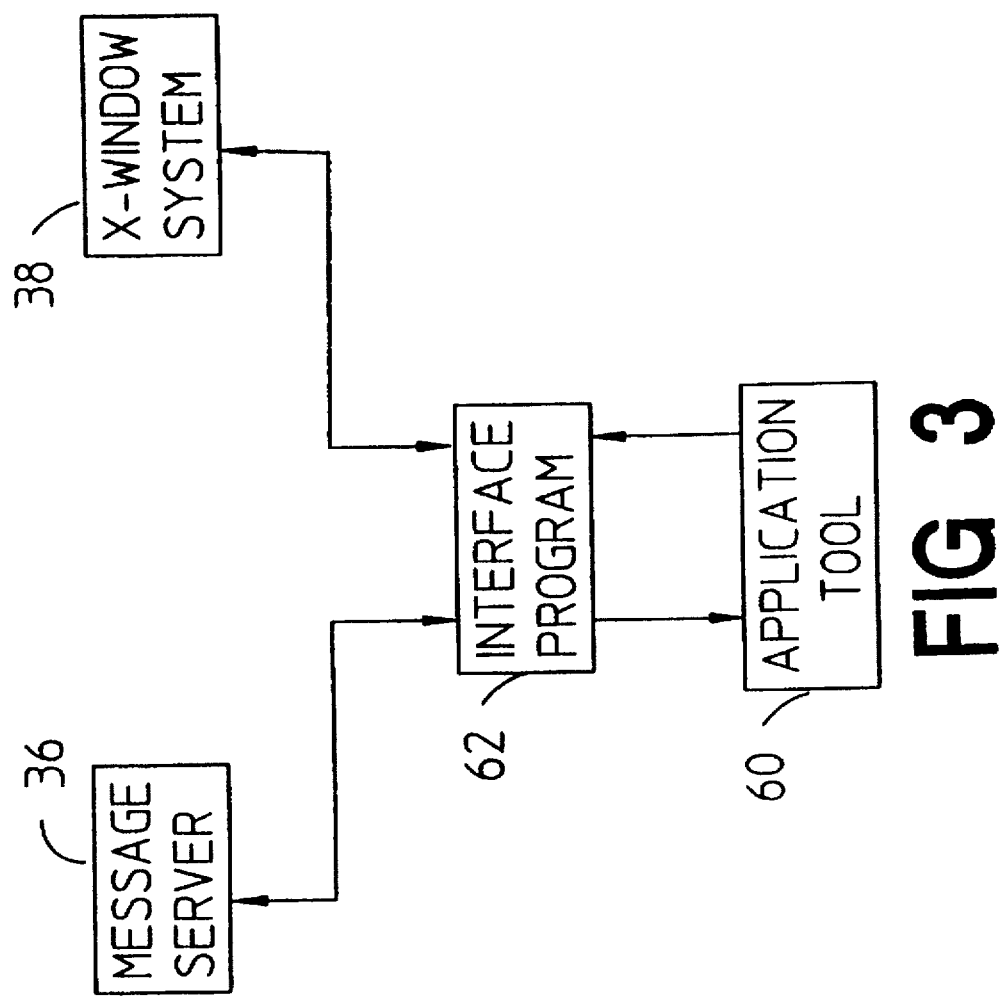
FIG. 3 is a block diagram that illustrates the encapsulation of an application tool into the CASE system using an interface program.

As indicated above, specialized application tools can be integrated into the CASE system using a technique known as encapsulation. Encapsulation of an application tool is shown schematically in FIG. 3. An application tool 60 is integrated into the CASE system using an interface program 62 (encapsulation). Other tools in the CASE system communicate with the application tool 60 through message server 36 and interface program 62. A user communicates with application tool 60 through X-Window System 38 and interface program 62. The interface program 62 permits the application tool 60 to be integrated into the CASE system using only the binary executable code of the application tool, without reengineering the application tool. Encapsulation of application tools is described in detail in the aforementioned U.S. Pat. No. 5,075,847.

The present invention relates to the situation where the application tool 60 is a screen-oriented application tool, or a full-screen application tool. A full-screen application tool is one that places text in fixed locations on a display screen. A well known example of a full-screen application tool is a spreadsheet program. Other screen-oriented application tools include the UNIX tools "vi", "xdb" and "isql". The interface program 62 functions as a terminal emulator for interaction with the screen-oriented application tool 60. In addition, the interface program 62 identifies predefined application tool events and generates triggers for notification of the user and/or other tools in the CASE system. The trigger may cause a message to be sent to the message server for forwarding to one or more of the other tools in the CASE system. The trigger may also cause notification of the user. Finally, the trigger may cause commands to be sent to the application tool as if the user had typed them.

The application tool events that cause generation of a trigger are defined as required by the user. Each event is defined in terms of a region of the display screen. The region is defined by a start row, an end row, a start column and an end column on the display screen. The region may include all or part of the display screen. In addition, the cursor position is an integral part of screen events associated with the application tool. Thus, an event may occur when the cursor enters a predefined region or when the cursor exits from a predefined region. The event may also be independent of the cursor position. Additional features which may be included in the definition of an event are a text change within a predefined region (including a change in display enhancements such as underlining or reverse video) and text within a predefined region matching a specified pattern.

Figure 4:
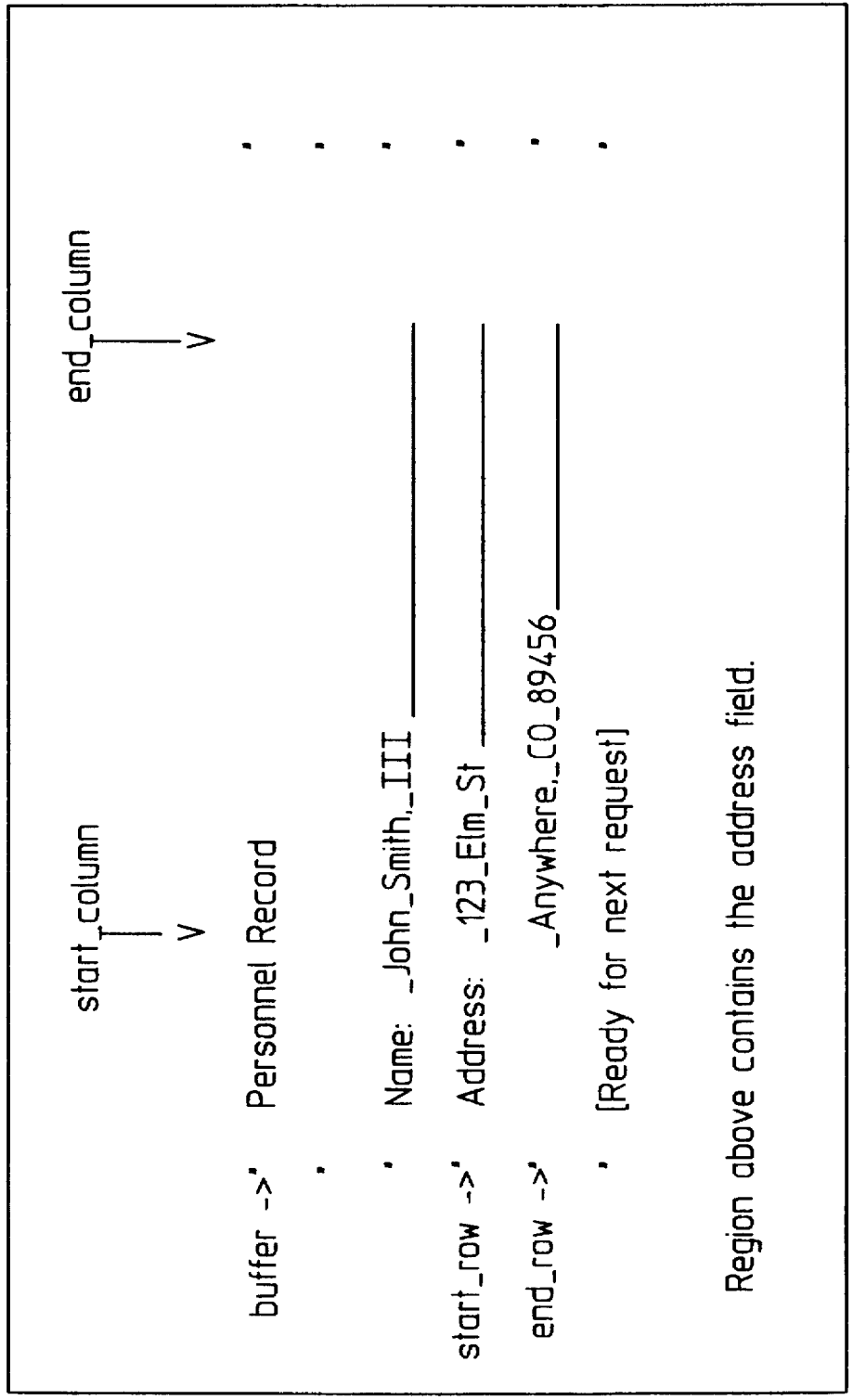

An example of a region of a display screen is shown in FIG. 4. The application tool generates a personnel record form containing various information fields. In the specific example shown, the start row, end row, start column and end column identify the address field. Only events occurring within the address field of the display screen will be identified, as described below.

In accordance with the invention, the following types of application tool events can be recognized for generating triggers:

1. The cursor enters a predefined region. This event type can be used to recognize a mode change in a program. It can also be used in connection with traversing a form, which requires knowing when the cursor has entered a specific data entry field on the form. An example in which an event is defined when the cursor enters a predefined region is shown in FIG. 5. The predefined region is the ninth row of the display screen. The ninth row involves command entry whereas rows 1 to 8 involve text editing. By defining an event when the cursor enters the ninth row, a change to the command mode is recognized.

2. An event occurs when the cursor exits from a predefined region. This event type can be used to recognize a task completion in a program. For example, in FIG. 6 when the cursor exits from row 9 of the display screen, command mode completion is indicated. This event type can also be used in connection with traversing a form, which may require knowing when the cursor has left the data entry field.

3. An event occurs when text within a predefined region is modified. This event type is independent of cursor position and can be used to track immediate changes to the display screen, such as recognizing command entry as it is typed.

4. An event occurs when the text within a predefined region is modified and the cursor has exited from the predefined region. This event type is not generated until the information within the predefined region has stabilized, as indicated by the cursor exiting from the region.

5. An event is generated when the text within the predefined region changes and the new contents of the region match a desired pattern. This event type, which is independent of cursor position, can be used to recognize one of a known set of values, such as a status line.

6. An event occurs when the text within a predefined region changes, the new contents of the region match a desired pattern and the cursor has exited from the region. This event type can be used to recognize completion of a specific value written to the display screen. An example of this event type is shown in FIG. 7. The event occurs only when a specific entry is made within the predefined region. In FIG. 7, an employee number is represented by [0–9]*. This notation indicates that the employee number part of the pattern to be matched can have any numerical value. By waiting until the cursor exits from the predefined region, it can be assured that the employee number is complete.

7. An event occurs when the application tool rings the terminal emulator bell. This event is used when the application tool indicates certain error conditions by ringing the bell instead of by displaying an error message.

8. An event occurs when the application tool scrolls the text within the terminal window. This event is used to react to the case in which an application tool rolls data off the terminal screen or if it inserts or deletes a line of text.

As described in U.S. Pat. No. 5,075,847, the user specifies the functions to be performed by the interface program using a interface description language (IDL). IDL provides constructs for creating object attributes and object events and has simple control constructs to manipulate the run time environment of the objects. IDL also contains data types for objects, events, object locations, object attributes and simple data types such as Boolean, integer and string. The basic data types are described in the above-identified patent.

In accordance with the present invention, an interface program, or object, called "Terminal" allows interaction and communication with a screen-oriented application tool. The Terminal object creates a window that interacts with the application tool to emulate the correct terminal behavior. Using the Terminal object, a screen-oriented application tool can be integrated with the message server and other features of the CASE system.

The Terminal object is optionally displayable. Because the application tool may very interactive, mouse events performed on the Terminal object display are recognized. It is possible to read sections of the display as a block of text. It is possible to map sections of the Terminal object display to a TermRegion object as described below. (The TermRegion object is an optional feature of the interface program for mapping regions of the application tool display screen to different regions of the user display screen in the CASE system.) The interface program reacts to changes in the application tool output so that region events are recognized as described above. Region events involve cursor movement, text changes and text pattern matches. Typing in the Terminal object sends the text to the associated application tool.

The following are Terminal object attributes:

1. ROWS (integer) gives the height in characters of an object (overrides HEIGHT).

2. COLUMNS (integer) gives width in characters of an object (overrides WIDTH).

3. HEIGHT (integer) gives height in pixels of the display object (is rounded to an even number of characters).

4. WIDTH (integer) gives width in pixels of the display object (is rounded to an even number of characters).

5. XOFFSET (integer) gives horizontal offset from the last object for object placement.

6. YOFFSET (integer) gives vertical offset from the last object for object placement.

7. XLOC (integer) gives a horizontal offset for displaying the object.

8. YLOC (integer) gives vertical offset for displaying the object.

The following attributes are settable or changeable after the call to make_object.

9. MAPPED tells the object to make the terminal window visible. 10. UNMAPPED tells the object to hide the terminal window.

11. FONT (string) gives the name of the font to use for displaying text (must be a fixed width font).

12. BGCOLOR (string) gives the name of the background color to use for the object.

13 FGCOLOR (string) gives the name of the foreground color to use for the object.

Screen-oriented application tools fall into several classes: (1) those having a single main view whose contents change based on interactive input from the user, such as "vi", (2) those having several panes that change somewhat independently, such as "xdb" and (3) form-based application tools, such as "isql", an Informix database tool. These programs have several pages which are divided into several input areas.

The following are examples of encapsulations of screen-oriented application tools into the CASE system using the Terminal object interface program.

The application tool "vi" has a very distinctive user interface that does not change much. The bulk of the terminal window shows the text being edited. The bottom line of the display is used for command entry and for displaying status information. Additions to the user interface such as menus, text selection with the mouse and cursor placement with the mouse are possible enhancements. A potential solution in this case is to use the Terminal object in display mode (attribute: MAPPED) and to set up events to react to mouse actions (for selection and cursor movement) in the Terminal object. In the Toplevel object, menus are defined to add functionality. The menu items can map to commands that are sent to "vi" to cause actions such as search.

The application tool "xdb" has separate sections of the screen that are dedicated to different tasks, such as program tracing and command entry. In an encapsulation of the "xdb" application tool, sections of the original terminal display can be mapped to separate TermRegion objects. Menus and command buttons are mapped to "xdb" commands. Output from the debugger is interpreted to show target program I/O separate from user I/O (command responses). The terminal object itself would not be displayed (attribute: UNMAPPED) but the TermRegion would be mapped. Text matching within the display objects can be used to separate command output from user I/O.

The Terminal object allows user events, TextRegion events and Scroll events. The user event triggers are:

1. Select occurs when a mouse "click and drag" takes place, highlighting text. The instance data (the data passed to the subroutine, or callback function, when the event occurs) is the selection position on the screen and the selected text.

2. Single is caused by single clicking the mouse while it is in the Terminal window. The instance data is the position where the single click occurred.

3. Release occurs when the current selection is de-selected (unhighlighted). The instance data is the screen position of the last mouse event.

4. Double is caused by double clicking the mouse while it is in the terminal window. The instance data is the position where the double click occurred.

5. Bell is caused by the application program ringing the bell for an error condition.

TextRegion events are specified with an event mode, a cursor behavior mode and a screen region. In addition, for expression events, a regular expression pattern is specified. There are three TextRegion event modes. The TextRegion event modes correspond to the screen events described above.

1. A cursor event occurs when the cursor enters or exits from a specified region. This is useful for determining whether an input field in a form-based application tool was skipped. The instance data includes the region boundary points, the cursor behavior mode (Entry or Exit) and the text within the region.

2. A change event occurs when the text within a region changes. When the cursor mode is Immediate, the event triggers as soon as the text is changed. When the cursor mode is Exit, the event is triggered when the cursor has exited from the region. This event is useful for detecting that a status line has changed. The instance data includes the region boundary points, the cursor behavior mode (Immediate or Exit) and the text within the region.

3. Expression events are similar to change events. These events wait for the text within the specified region to change, but are not triggered until the new text matches a desired regular expression. When the cursor behavior is Immediate, the regular expression is checked as soon as the text is changed. When the cursor behavior is Exit, the regular expression is not checked until the cursor exits from the region. This event is useful for checking that a field has changed to one of several known values. The regular expression is applied to the entire region, but may be written such that portions of the region are ignored in determining a match. The instance data includes the region boundary points, the cursor behavior mode (Immediate or Exit), the text within the region, the regular expression text and the pattern variables for subexpression matches.

Scroll events have a line number supplied as a trigger. If the data within a Terminal window scrolls (up or down) through the given line, then the event is triggered. The instance data is the line where the scroll originated.

The following specifies functions associated with the Terminal object.

1. All_text (object) returns the text contents of the Terminal object.

2. Clear (object [,object . . .]) clears the data in a Terminal object.

3. Clear_selection (terminal) clears the current selection (highlighted text) in the Terminal object screen.

4. Copy_selection (terminal) saves the current selection so it can be pasted into other display objects.

5. Fetch_selected (object) returns the selected line or lines from a Terminal object.

6. Get_cursor_position (object, row, column) returns the row and column position of the cursor in the Terminal window.

7. Get_selected_position (object, row, column) returns the row and column position of the beginning of the selected text in the Terminal window.

8. Get_text_region (object, start row, end row, start column, end column) reads the text at the given location from the Terminal object. The start row and start column define the upper left corner to start reading. The end row and end column define the lower right corner of the region to be read.

9. Make_region_trigger (mode, start row, end row, start column, end column, cursor, regex) builds a trigger for a TextRegion event. The mode parameter specifies the event mode of interest (Cursor, Change, or Expression). The start row and start column define the upper left corner of the region. The end row and end column define the lower right corner of the region. The cursor mode parameter specifies the cursor mode as it relates to the event desired. The cursor modes include Entry (Cursor events only), Immediate (Change and Expression events) and Exit (all TextRegion events). The regex parameter specifies the pattern that will be matched for expression events.

10. Map_text_region (terminal, region, row, column) maps a portion of the Terminal object screen to a TermRegion objects. This function allows portions of the terminal screen to be displayed independently. The terminal parameter must be a Terminal object, the region parameter must be a TermRegion object, and row and column must be such that the region can be placed there without extending past the bounds of the terminal. Thus, the region shows the mapped data (the size of the TermRegion) from the Terminal. Typically, if a region of the screen is being displayed, the Terminal will be initialized with the UNMAPPED attribute (showing both is usually redundant). When this function is called, the TermRegion is loaded with the current contents of the Terminal object screen at the region location. The TermRegion is updated automatically with new screen contents. Typing in the TermRegion functions the same as typing in the related terminal object in that the text is sent to the associated application tool.

11. Paste_selection (terminal, source) pastes (inserts) text from the source into the Terminal object. This causes the text to be sent to the associated application tool.

12. Set_bell (terminal, flag) allows the bell to be enabled or blocked in the Terminal object. If the bell is blocked anal the application program tries to ring it, the bell is ignored.

13. Set_selection (object, start row, start column, length) selects the indicated span of text. This text will be highlighted if it is visible. The selected text may span multiple lines.

Figure 8:
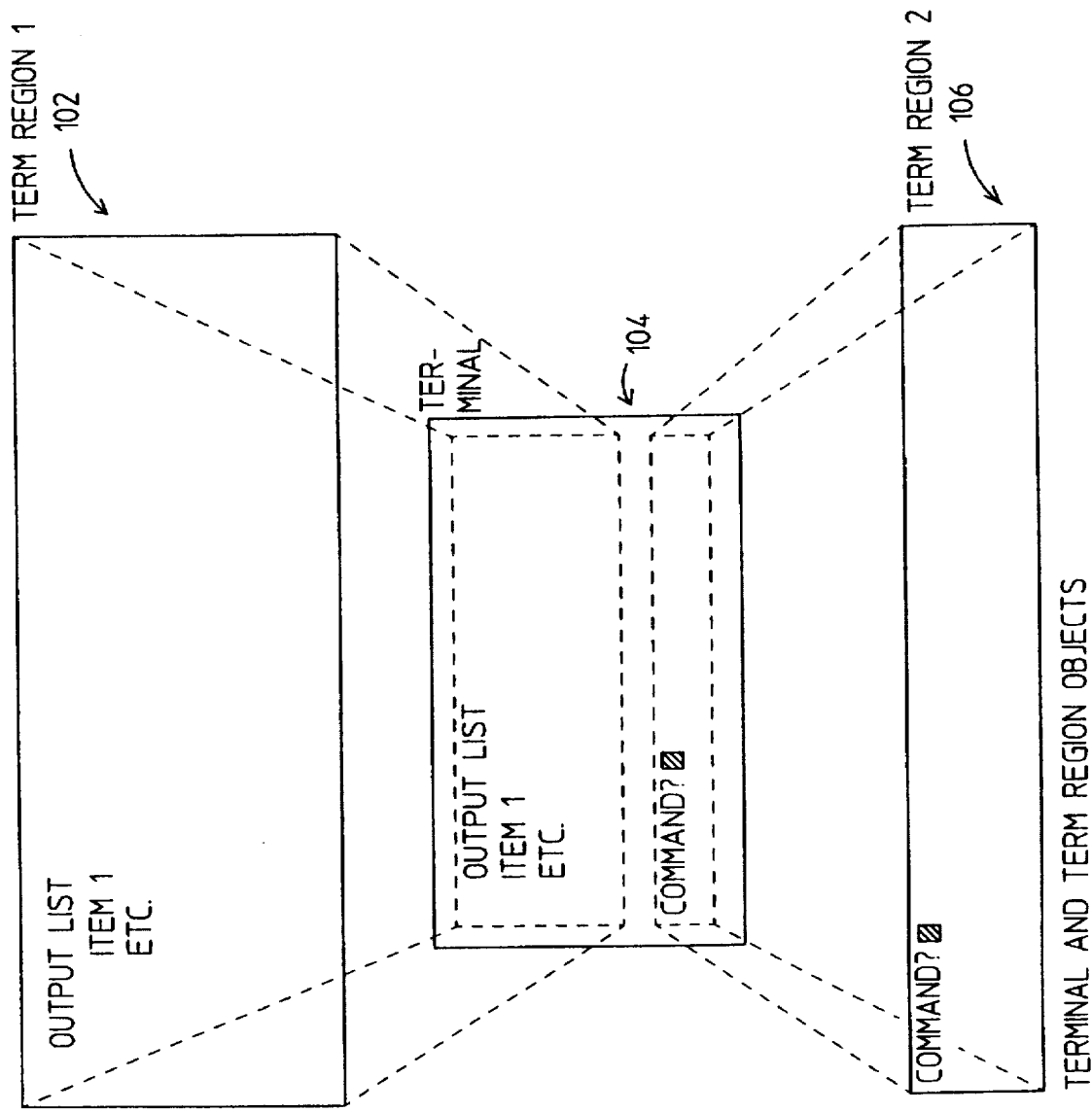
FIG. 8 is a representation of the relationship between Terminal and TermRegion objects, where regions are mapped from Terminal objects.

The TermRegion object is used to map regions of the Terminal screen as in FIG. 8. In this example, there is a single Terminal object 104. Two TermRegion objects 102 and 106 are each mapped to a separate region of the original Terminal display. These two TermRegions may be displayed in a different configuration than the original Terminal display. A TermRegion object is associated with a Terminal object using a call to map_text_region(). When the Terminal object is associated with an application tool, the TermRegion object is updated as output is generated. When a user types in the TermRegion object, the text is sent to the application tool as program input. The TermRegion object is used to map the display screen generated by the application tool to a different region of the user display screen. The attributes, user events and functions of TermRegion are the same as those described above for the Terminal object.

The following are the steps for encapsulating a screen-oriented application tool.

1. Create a Terminal object. The size of the Terminal object (in rows and columns) is the size of the terminal window.

2. Associate the Terminal object with a subprocess object (application tool). These two objects are associated with a call to set_output. This is done before the subprocess is started. The subprocess is used to run the screen-oriented application tool.

3. If necessary, map regions of the terminal screen to TermRegion objects. This step is optional. The terminal display can be broken up into separate sections by using map_text_region.

4. Determine terminal user events, if any. It may be desirable to allow the Terminal or TermRegion objects to respond to user events such as selecting or releasing text or double clicking.

5. Determine the screen behavior that is of interest and define TextRegion events. TextRegion events are defined and attached to the Terminal object. These events allow the interface program to react to state changes in the screen-oriented application tool.

Figure 9:
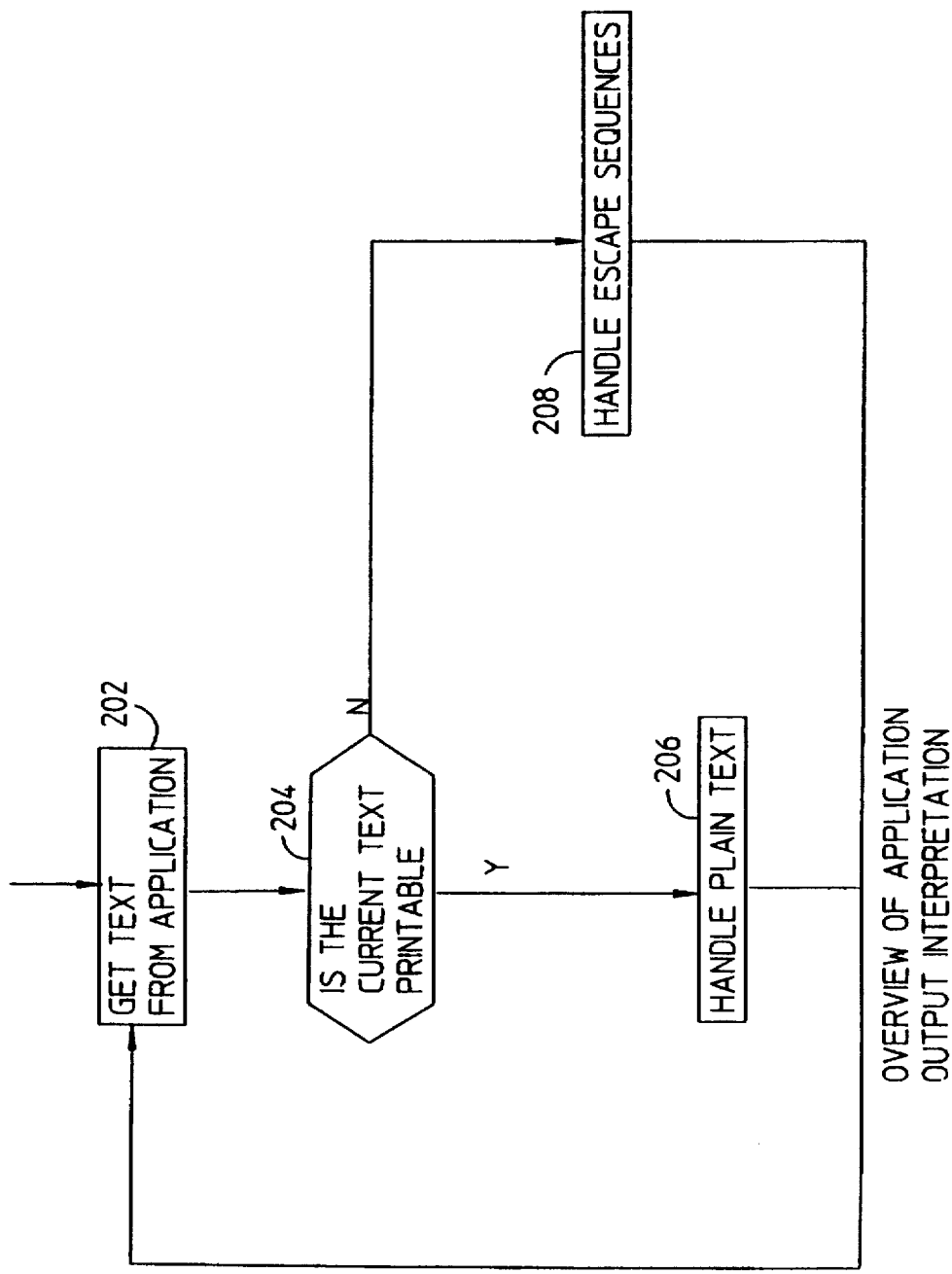
Figure 10:
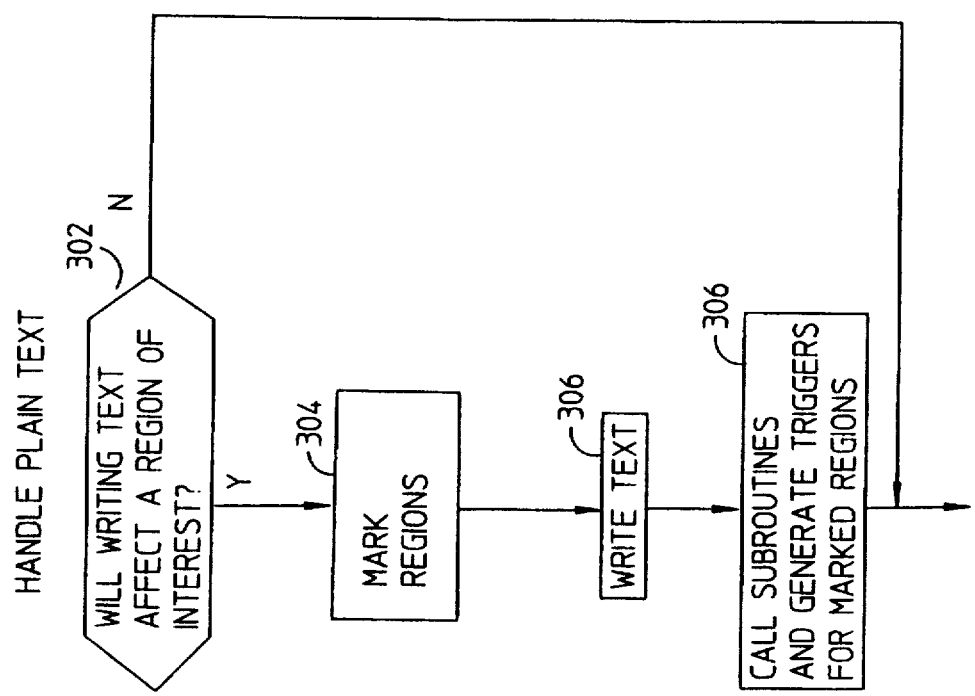

The flow diagrams in FIGS. 9–11 provide an overview of how TextRegion events work. This is true of all types of TextRegion events (Cursor, Change, and Expression). The chief difference between these event types is in determining whether writing text or performing a given action will trigger the event. In FIG. 9, step 202, the software waits for output text from the application tool. When data arrives, it will either be printable text or special codes (known as escape sequences) for controlling the display. In step 204, the data is checked to see which of these two classes it falls into. If the data is printable text, it is handled in step 206 (shown in more detail in FIG. 10). Otherwise, the data is handled in step 208 (which is shown in more detail in FIG.

11). After the text is processed (including event handling and trigger generation), the program returns to step 202 and waits for more application program output.

In FIG. 10, step 206 of FIG. 9 is broken into its constituent pieces. Step 302 determines whether writing the text to the current cursor position will affect one of the predefined regions. In order to simplify keeping track of all the predefined regions, they are organized into a list. If a region in the list is affected by the text writing, the region is marked for later handling in step 304. Then, the data is written to the display in step 306. Finally, in step 308, for all regions that were marked (because they were affected), the associated event subroutines, also known as event callbacks, are called and event triggers are generated. Note that the event is not generated immediately on recognizing that the text written will affect the region. This is because writing the text may affect several regions and all of these should be checked independently. Only then can the data be written to the display. The events cannot be triggered until the data is written because the new screen contents are part of the instance data for the event (i.e. this information is used to describe what caused the event).

Similarly, in FIG. 11, escape sequences are handled. A first step 402 is to interpret the escape sequence into an action. Then, the action is checked against the predefined regions in step 404, as in FIG. 10, step 302. It should be understood that the other events (Bell and Scroll events) are not shown in FIGS. 9–11 for the sake of clarity. The Bell events are handled in the loop in FIG. 9. Bell events are triggered if the escape sequence for the Bell action is received. Scroll events are triggered, if necessary, during the processing of the actions.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A method for operating screen-oriented software application tool in a computer-aided software development system, said software development system including an electronic digital computer and computer software for operating said computer, said computer software comprising a user interface, an operating system, an interface program and one or more software development tools for performing predefined software development tasks, said computer executing said interface program for performing said method, comprising:

controlling communication between said software development tools and said screen-oriented application tool, said screen-oriented application tool containing a representation of a display screen comprising a two-dimensional character array and a text output cursor, said screen-oriented application tool not being designed for operation with a graphical user interface and having outputs consisting of printable text and special codes for controlling the display screen by positioning the text output cursor, writing characters to the two-dimensional character array, and clearing characters from the two-dimensional character array;

monitoring said outputs of said application tool and detecting in said outputs the occurrence of a predefined application tool event in a predefined region of said representation of said display screen, said predefined application tool event comprising said text output cursor entering or exiting said predefined region; and generating a trigger in response to detecting in said outputs of said application tool the occurrence of said predefined application tool event within said predefined region, including the text output cursor entering or exiting said predefined region.

2. A method as defined in claim 1 wherein said predefined region is defined by a start row, an end row, a start column and an end column.

3. A method as defined in claim 1 wherein the step of generating a trigger includes generating said trigger when text within said predefined region is modified and the text output cursor has exited from said predefined region.

4. A method as defined in claim 1 wherein the step of generating a trigger includes generating said trigger when text within said predefined region has changed, new text matches a desired pattern and the text output cursor exits from the predefined region.

5. A method as defined in claim 1 wherein the step of generating a trigger includes executing a subroutine.

6. A method as defined in claim 5 wherein the step of executing a subroutine includes notifying the user that said predefined application tool event has occurred.

7. A method as defined in claim 5 wherein the step of executing a subroutine includes notifying one or more of said software development tools that said predefined application tool event has occurred.

8. A method as defined in claim 7 wherein the step of notifying one or more of said software development tools includes the step of sending a message to a broadcast message server for forwarding to said one or more software development tools.

9. A method as defined in claim 5 wherein the step of executing a subroutine includes sending one or more commands to the application tool in response to occurrence of said predefined application tool event.

10. Apparatus for operating a screen-oriented software application tool in a computed-aided software development system, said software development system including computer software comprising a user interface, an operating system and one or more software development tools for performing predefined software development tasks, said apparatus comprising:

an electronic digital computer for operation with said computer software, including a central processing unit and a memory unit;

means for controlling communication between said software development tools and said screen-oriented application tool, said screen-oriented application tool containing a representation of a display screen comprising a two-dimensional character array and a text output cursor, said screen-oriented application tool not being designed for operation with a graphical user interface and having outputs consisting of printable text and special codes for controlling the display screen by positioning the text output cursor, writing characters to the two-dimensional character array, and clearing characters from the two-dimensional character array;

means for monitoring said outputs of said application tool and detecting in said outputs the occurrence of a predefined application tool event in a predefined region of said representation of said display screen, said predefined application tool event comprising said text output cursor entering or exiting said predefined region; and means for generating a trigger in response to detecting in said outputs of said application tool the occurrence of said predefined application tool event within said predefined region, including means for generating said trigger when the text output cursor enters or exits said predefined region.

11. Apparatus as defined in claim 10 wherein said means for generating a trigger includes means for generating said trigger when text within said predefined region has changed, new text matches a desired pattern and the cursor exits from the predefined region.

12. Apparatus as defined in claim 10 wherein said means for generating a trigger includes means for generating said trigger when text within said predefined region is modified and the cursor has exited from said predefined region.

13. Apparatus as defined in claim 10 wherein said means for generating a trigger includes means for notifying one or more of said software development tools that said predefined application tool event has occurred.

14. Apparatus as defined in claim 10 wherein said means for generating a trigger includes means for sending one or more commands to the application tool in response to occurrence of said predefined application tool event.

* * * * *